United States Patent [19]
Lai

[11] Patent Number: 5,201,531
[45] Date of Patent: Apr. 13, 1993

[54] FACE SEAL WITH DOUBLE SPIRAL GROOVES

[75] Inventor: Wei-Tang Lai, Hoffman Estates, Ill.

[73] Assignee: John Crane Inc., Morton Grove, Ill.

[21] Appl. No.: 862,463

[22] Filed: Apr. 2, 1992

[51] Int. Cl.[5] .............................................. F16J 15/32
[52] U.S. Cl. .................................. 277/96.1; 277/81 R
[58] Field of Search ...................... 277/96, 96.1, 81 R, 277/27, 133

[56] References Cited

U.S. PATENT DOCUMENTS

| | | | |
|---|---|---|---|
| 3,109,658 | 11/1963 | Barrett et al. | 277/96 |
| 3,638,957 | 2/1972 | Marsi | 277/96.1 |
| 3,744,805 | 7/1973 | Heinrich | 277/96.1 |
| 3,751,045 | 8/1973 | Lindeboom | 277/96.1 |
| 4,420,162 | 12/1983 | Yanai et al. | 277/96.1 |
| 4,645,414 | 2/1987 | DeHart et al. | 277/96.1 |
| 5,090,712 | 2/1992 | Pecht et al. | 277/96.1 |

Primary Examiner—William A. Cuchlinski, Jr.
Assistant Examiner—Daniel G. DePumpo
Attorney, Agent, or Firm—Kinzer, Plyer, Dorn, McEachran & Jambor

[57] ABSTRACT

A mechanical face seal for a high speed, rotary fluid pressure device comprising rotating and stationary seal rings disposed in a housing and having confronting radial seal faces normally biased into engagement with one another. Oppositely inclined sets of spiral grooves are formed in the seal face of one ring, one set functioning to pump fluid from the reservoir downstream between the seal faces, and the other set functioning to pump fluid between the faces upstream back toward the reservoir. Each downstream pumping groove preferably intersects only one upstream pumping groove. Fluid pressure between the faces forms a gap therebetween, and the reversely inclined groove construction minimizes fluid loss or leakage.

20 Claims, 2 Drawing Sheets

FACE SEAL WITH DOUBLE SPIRAL GROOVES

BACKGROUND OF THE INVENTION

This invention relates to mechanical face seals, and more particularly to an improved mechanical face seal utilizing a double spiral groove configuration to minimize wear and leakage.

Mechanical face seals of the type referred to herein are particularly useful in high speed fluid operating devices, and generally include a pair of rings, a primary sealing ring and a mating ring which are formed with confronting, generally radial sealing faces which define an annular seal interface. One of the rings is fixed for rotation with a rotating shaft, while the other ring is non-rotatably secured to a housing in which the shaft is supported. Means are provided to normally bias one of the rings toward the other so that the seal rings normally engage under static conditions. Under dynamic conditions, pressurized fluid in the housing is caused by the geometry of the ring faces to move between the rings and overcome the biasing force and thereby to form a minute gap between the ring faces. Ideally, this gap is sufficient to prevent contact between the seal faces (to minimize heat and wear), and small enough to minimize fluid leakage across the seal faces.

The fluid under pressure in the housing is present adjacent one circumferential edge of the sealing ring interface, while the area adjacent the other circumferential edge of the ring interface is at a lower or ambient pressure. The edge exposed to the fluid under pressure could be at the inner diameter or outer diameter depending how the seal is arranged between the shaft and housing.

The confronting face of one of the rings is formed with spiral shaped pumping grooves which are inclined in a direction so that, when the shaft is rotated, fluid is pumped from the edge of the rings exposed to the fluid under pressure in between the sealing faces and toward the edge of the rings exposed to lower pressure. This fluid pumping action creates the intended gap between the rings which desirably is maintained over the entire range of the shaft speeds and pressures. Thus, there is little or no contact between the primary and mating ring faces under dynamic conditions.

It will be appreciated that it is important to control fluid "leakage," i.e., loss of fluid by passage fully through and between the sealing ring faces. To this end, it has been proposed to provide a double spiral groove pattern with reverse inclined pumping grooves in the seal face which, in effect, pump the fluid back toward the fluid under pressure within the housing. The intended effect is to utilize fluid present between the sealing faces of the seal rings to maintain the desired gap between these faces during shaft rotation while preventing loss of fluid or "leakage".

SUMMARY OF THE INVENTION

The present invention provides an effective face seal between confronting, generally radial faces of relatively rotatable rings which are normally biased toward engagement. The invention achieves the desired gap for little or no contact between the seal faces and is effective to minimize fluid leakage between the faces. The invention utilizes a double spiral pumping groove configuration in one of the faces which includes downstream pumping grooves which are effective to pump fluid from within the pressurized housing in between the seal faces to provide the desired gap therebetween. Upstream pumping grooves, which are sized and positioned relative to the downstream pumping grooves, pump fluid back toward the source of fluid pressure within the housing so that fluid leakage is minimized.

The present invention is useful both in constructions wherein the pumping grooves are formed in the non-rotating ring or in the rotating seal ring. The invention also is useful in constructions where the seal outside diameter is exposed to the fluid under pressure, as well as in constructions where the seal inside diameter is exposed to the fluid under pressure.

The present invention is believed to be applicable to both liquid and gas pressure seals and has been tested successfully in a liquid seal.

The present invention encompasses a mechanical seal construction for sealing between a stationary housing containing a fluid under pressure and a shaft rotatably supported in the housing. It comprises a pair of relatively rotatable sealing rings surrounding the shaft, one of the rings being rotatable with the shaft and the other being fixed relative to the housing, the rings having confronting, generally radial faces defining a mating interface, and means normally biasing one of the rings toward the other. A fluid under pressure is adapted to be exposed to one circumferential edge of the ring interface, the other circumferential edge of the ring interface is adapted to communicate with lower pressure existing outside of the housing.

Spiral groove means are provided in the confronting face of one of the rings, including a plurality of uniformly disposed inclined downstream pumping spiral grooves commencing at and extending through the circumferential edge of the ring which edge is adapted to be exposed to the fluid under pressure within the housing and extending toward the edge of the rings adapted to be exposed to the lower pressure, the spiral grooves being operable, during rotation of the shaft, to pump fluid from the higher pressure toward the lower pressure across the seal ring interface, the spiral groove means further including a plurality of uniformly disposed upstream pumping spiral grooves commencing near the circumferential edge adapted to be exposed to low pressure and inclined oppositely to the downstream pumping grooves, the upstream pumping grooves being operable to pump fluid between the confronting ring faces back toward the circumferential edges of the rings adapted to be exposed to the high pressure within the housing, with the downstream pumping grooves terminating at the intersection with the upstream pumping grooves.

For purposes of this invention, the "radial projection" of a groove is the length along a radial line, the radial line passing through the center of the annular ring the length being defined by points of intersection of that line with circular arcs, taken from the center of the ring, which pass, respectively, through the point of inception, and point of termination of the groove. The point of inception and point of termination are further defined as being along the centerlines of the grooves.

An alternative interpretation of the radial projection is to consider the ring as having an annular face. The annular face of the ring is itself divided into two or more annular portions of the face. The two or more annular portions comprise the face and each portion contains a specific type of groove pattern comprising the downstream and upstream spiral grooves discussed above.

In use of the invention as a liquid pressure seal, the relation between the spiral grooves is expressed by the ratio:

$$3 \geq d_2/d_1 \geq \tfrac{1}{3}$$

and by the ratio:

$$1 \geq d_3/d_1 \geq 0$$

where $d_1$, $d_2$ and $d_3$ are defined as follows:

$d_1$ is the total radial projection of each downstream pumping spiral groove from its inception commencing at the circumferential edge of the ring exposed to high pressure to its intersection along its centerline with its associated upstream pumping groove along its centerline;

$d_2$ is the radial projection of each of the upstream pumping spiral groove from its inception near the edge of the ring exposed to the low pressure edge of the rings to its intersection with its associated downstream pumping spiral groove the intersection being defined as the intersection of the centerlines of each groove;

and $d_3$ is the radial projection along a radial line of each upstream pumping groove along its centerline from its intersection with the centerline of its associated downstream pumping spiral groove to its point of termination nearest the circumferential edge the ring exposed to high pressure.

Preferably, the downstream pumping spiral grooves terminate at the intersecting point with the upstream pumping spiral grooves. All of the grooves are separated by lands, all of which are at a uniform elevation. The upstream pumping grooves do not extend to the edge of the seal ring interface so that an annular land, at the same elevation as the lands between the grooves, is formed in the grooved sealing ring adjacent the low pressure edge of the seal ring interface exposed to the low pressure fluid. The "mating interface" is that part of its face which contacts the face of the other ring. In certain embodiments, one of the rings has a greater outer diameter than the other ring, and will have a part of the sealing face outside of the mating interface.

The annular land defines a static pressure dam between the rings for sealing when the rotating ring is stationary. An annular groove on the same ring, adjacent the annular land and disposed radially toward the high pressure edge of the ring, communicates with the upstream pumping spiral grooves to further assist in preventing leakage between the rings. It collects fluid that leaks across the seal faces and provides a conduit for disposition of that fluid to the upstream pumping grooves.

In the use of the invention as a pressure seal for liquid, the spiral pumping grooves preferably have circumferential width dimensions which are expressed by the following ratios:

$$3 \geq W_1/W_3 \geq 1/6 \text{ and } 3 \geq W_2/W_4 \geq 1/6$$

where $W_1$ is the circumferential groove width of the downstream pumping spiral grooves, $W_3$ is the circumferential width of the land between adjacent downstream pumping grooves measured at the same radius that $W_1$ is measured, $W_2$ is the circumferential groove width of the upstream pumping spiral grooves, and $W_4$ is the circumferential width of the land between adjacent upstream pumping grooves, measured at the same radius as $W_2$ is measured. For purposes of this invention, "circumferential width" is a circular width dimension taken along a circumferential line along a specified radius.

Relating the groove patterns to the alternative characterization of the annular face, referred to above, there is one portion of the seal face which is defined by an annular band that comprises downstream pumping grooves separated by lands. The radial width defined by the width of the annular band taken along a radial line which crosses the centerline of the ring, is identical to the radial projection $d^1$. Another way of defining the annular band is that portion of the space containing the seal face through which the downstream pumping grooves would rotate if the seal face were rotating.

Similarly, a second portion of the seal face defines another annular band that comprises upstream pumping grooves which are also separated by lands. The radial width of this annular band is identical to the radial projection $d_2$. A third annular band comprises both upstream and downstream pumping grooves and is identical to the radial projection $d_3$.

The depth of the spiral grooves are preferably from about 100 microinches to about 500 microinches, and preferably from about 200 to about 300 microinches.

DETAILED DESCRIPTION OF THE DRAWINGS

Figures 1, 2, 6, 7:
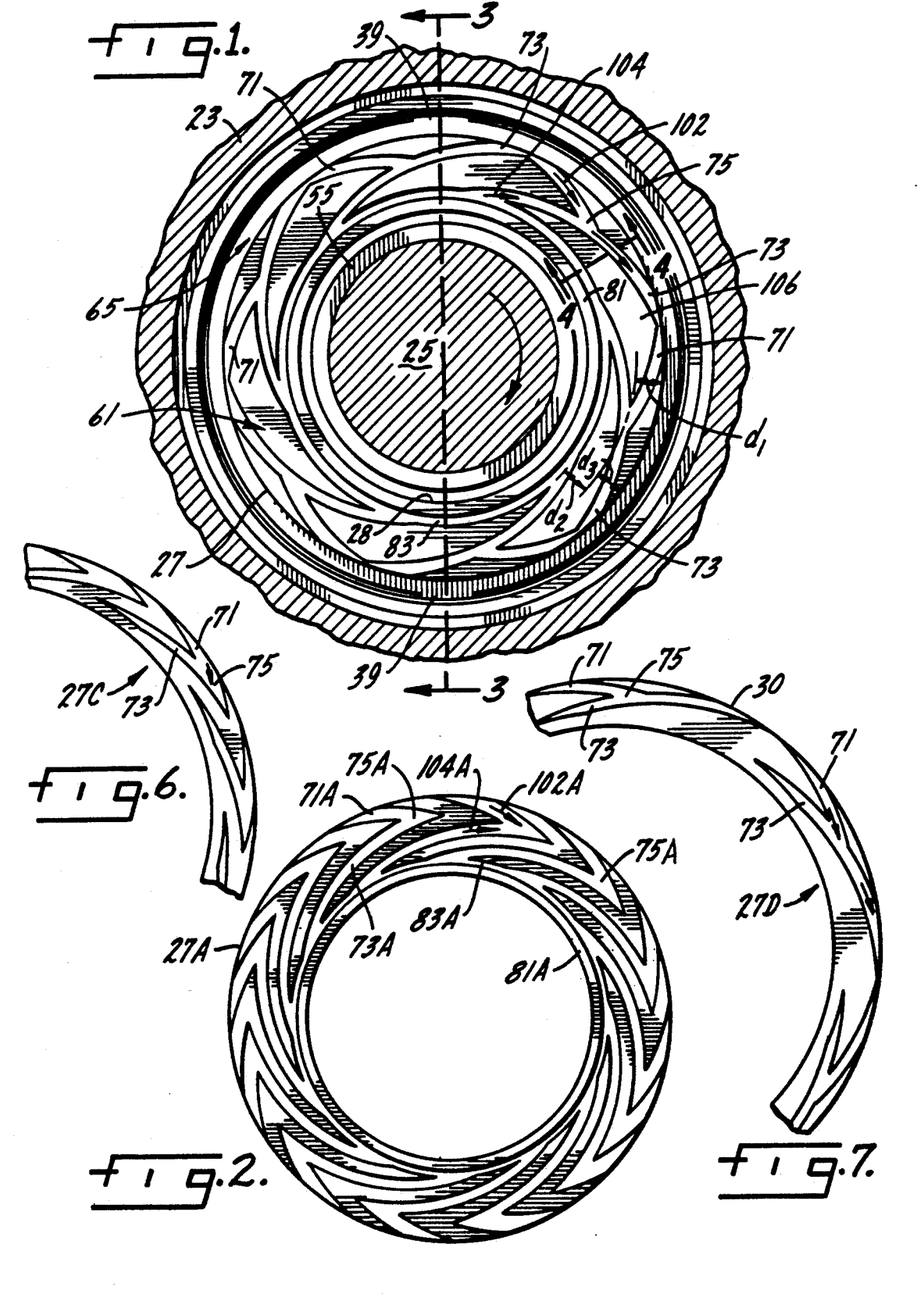
FIG. 1 is a sectional view of FIG. 3 taken along the line 1—1 thereof and illustrating a seal ring face provided with one preferred embodiment of spiral pumping grooves construction according to the present invention.
FIG. 2 illustrates a seal ring face provided with a modified form of spiral pumping grooves.
FIG. 6 illustrates a seal ring face provided with a modified form of spiral groove pattern.
FIG. 7 illustrates a seal ring face provided with a modified form of spiral groove pattern.
Figures 3, 4:
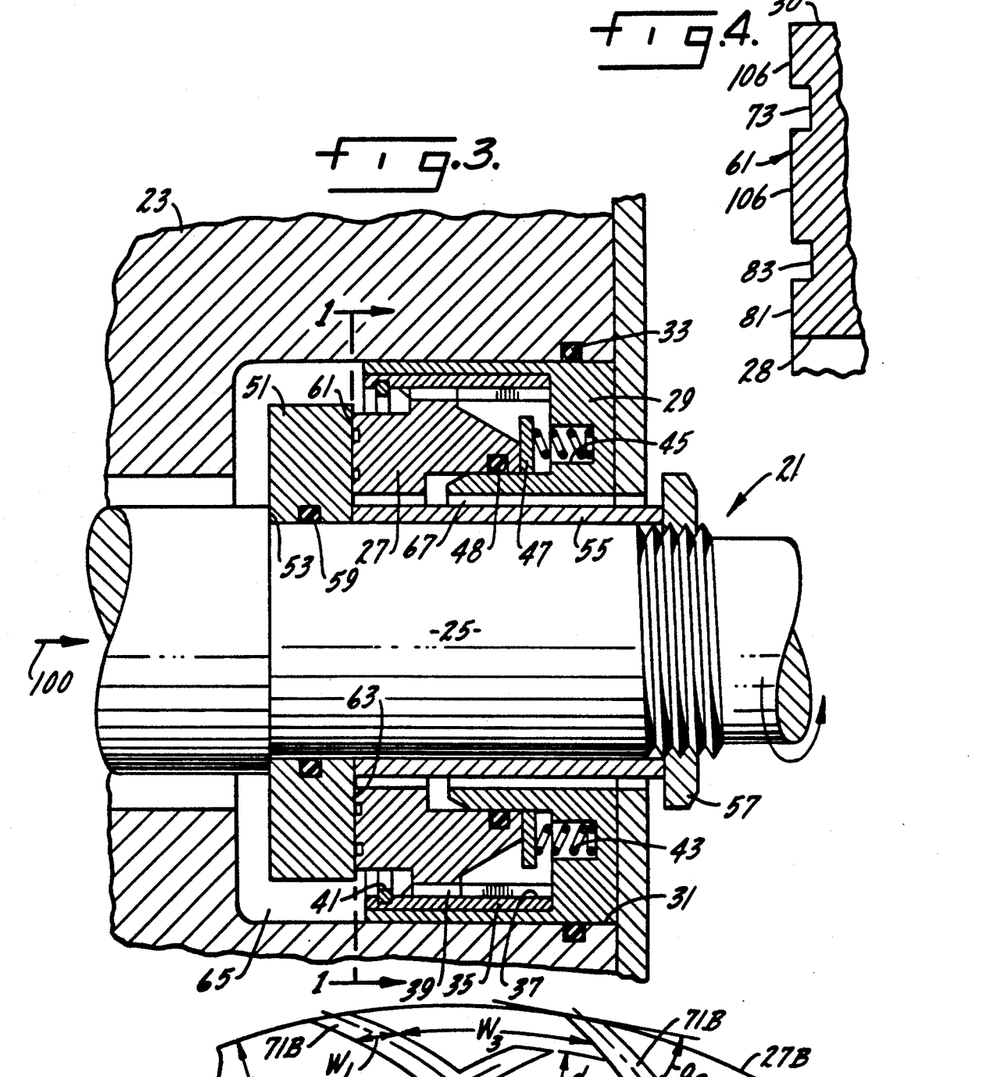
FIG. 3 is a sectional view of FIG. 1, taken along the line 3—3 thereof, through the centerline of the shaft.
FIG. 4 is a representative view on an enlarged scale, in cross-section of a seal ring taken approximately along line 4—4 of FIG. 1.

Referring now to the drawings, a dynamic mechanical seal construction embodying the present invention is illustrated generally at 21 in FIGS. 1 and 3. The illustrated embodiment is an outside-pressurized seal. That is, the outer peripheral edges of the relatively rotating seal rings which form the dynamic seal are exposed to the fluid to be sealed, the fluid being at a higher relative pressure than the environment adjacent the inside peripheral edges of the seal. The inside peripheral edges may be exposed to ambient conditions.

The mechanical seal is disposed between a stationary housing, and a shaft is rotatably supported in the housing. As embodied herein, a portion of a stationary housing 23 is illustrated and may be, for example, a housing for a high speed pump for handling liquids. The seal of the invention is however also considered suitable for sealing pressurized gas and may be used in compressors or the like.

A shaft 25 extends through the housing 23 and is rotatably supported therein by bearings (not shown) as will be understood by those skilled in the art. The shaft 25 is connected, for example, to an impeller (not shown) located within the housing 23 and is driven by means such as a motor (not shown) outside the housing, as is conventional. The device embodied here is adapted particularly for high speed, high pressure fluid handling installations.

It is important to provide a fluid pressure seal between the housing 23 and the shaft 25 which is effective to prevent, or at least minimize, loss of liquid from the housing. Such a seal is particularly important in high pressure environments. Because of the high speed operation of devices embodying this seal, it is also important to minimize wear of the seal parts which, in this type of installation, includes parts which rotate relative to one another at relatively high speeds.

In accordance with the invention, a pair of relatively rotatable sealing rings surround the shaft, one of the rings being rotatable with the shaft and the other fixed relative to the housing. As embodied herein, a primary sealing ring 27 is slidably supported on a retainer 29 which is disposed in an opening 31 in the housing 23. The retainer may be held by screws (not shown) to the outer cover of the seal, as is conventional. An O-ring seal 33 seated in housing 23 extends around the circumference of the retainer 29 to prevent fluid leakage between the housing 23 and the retainer 29.

The retainer 29 is generally U-shaped in cross-section, as shown in FIG. 3, and slidably receives the primary seal ring 27, as shown. A drive sleeve 35, pressed within the retainer 29, includes axial grooves 37 which slidably receive keys or radial protuberances 39 formed on the primary seal ring 27, as is shown in FIG. 1. The engaging keys 39 in keyways 37 allow the primary ring 27 to slide axially relative to the retainer 29, but prevent relative rotation therebetween. A retainer ring, such as a snap ring 41, is positioned in the drive sleeve 35 and limits the predetermined axial movement of the primary ring 27.

The primary ring 27 is biased to the left, as seen in FIG. 3, by means of a plurality of relatively light compression springs 43 seated in bores 45 in the retainer 29. The outer ends of springs 43 bear on a disc 47 which contacts the right hand end of primary ring 27. An O-ring 48 in the primary ring 27 engages the retainer 29 to prevent fluid leakage therebetween.

As further embodied herein, a rotating, mating seal ring 51 is mounted on the shaft 25 for rotation therewith. The mating ring 51 is disposed between an annular shoulder 53 on the shaft and a sleeve 55 mounted on the shaft. A nut 57 threaded on the shaft 25 holds the sleeve 55 in engagement with the mating ring 51. An O-ring 59 in the mating ring 51 engages the circumference of the shaft 25.

In accordance with the invention, the sealing rings have confronting, generally radial faces. Fluid under pressure within the housing is present adjacent the outer radial edges of the rings, and the area adjacent the inner radial edge or end of the rings is exposed to a lower pressure existing outside the housing, such as the ambient atmospheric pressure.

The illustrated embodiment is an outside pressurized seal; the higher pressure is at the outer diameter of the sealing interface, and the inner diameter is exposed to the lower pressure. The principles of the present invention may also be utilized with inside pressurized seals, where the higher pressure is at the inner diameter and the outer diameter is exposed to the lower pressure reservoir.

As embodied herein, the primary sealing ring 27 has a generally radial face 61, which confronts a generally radial face 63 on the rotatable mating ring 51. The mating interface is defined by the confronting portion of the two radial faces 61,63. A passageway 67 formed between the retainer 29 and the sleeve 55 serves as a communicating conduit between the area adjacent the inner diameters of the seal rings 27,51 and lower or ambient pressure outside the housing. The housing 23 contains a space or chamber 65 adjacent the outer diameters of the seal rings. In the disclosed embodiment, this area is exposed to the liquid under pressure. The sealing rings 27,51 function together with O-rings 33,48,59 to prevent escape of high pressure liquid from the reservoir 65 to the ambient environment through the passageway 67. Springs 43 normally bias the ring 27 toward the ring 51 to hold the faces 61,63 in contact.

In accordance with the invention, a double spiral groove pattern is formed in the confronting face of one of the seal rings. The double spiral groove means includes a plurality of uniformly disposed downstream pumping spiral grooves in communication with the high pressure fluid within the housing. The double spiral grooves are disposed at one circumferential edge or periphery of the rings. The grooves are inclined and extend toward the other circumferential edge of the ring which is exposed to low pressure. The grooves are effective during rotation of the shaft to pump fluid from the high pressure within the housing across the relatively rotating faces toward the low pressure adjacent the other radial edge of the rings.

The double spiral groove pattern further includes a plurality of uniformly disposed upstream pumping spiral grooves extending from near the circumferential edge of the rings exposed to low or ambient pressure toward the circumferential edges exposed to high pressure within the housing. The upstream pumping spiral grooves are inclined oppositely to the downstream pumping spiral grooves and pump fluid between the confronting ring faces back toward the high pressure edge of the rings. Each downstream pumping groove terminates at the intersection with an upstream pumping groove. Preferably, each one of such upstream pumping grooves intersect only one of the downstream pumping grooves.

In accordance with the invention, the double spiral groove pattern may be formed on either the radial face 61, of the primary sealing ring 27, or on the radial face 63 of the rotatable mating ring 51. Since the relative rotation of the seal rings acts on fluid between the faces 61 and 63, it is the inner and outer diameter of the portions of surfaces in mating contact that effect operation of the seal. Referring to the embodiment illustrated in FIGS. 3 and 4, the inner diameter and outer diameter of the mating surfaces are respectively defined by peripheral edge 28 of ring 27 and peripheral edge 30 of that same ring.

The principles of the present invention apply to both clockwise and counterclockwise rotating shafts and mating rings. The direction of inclination of the grooves depend upon whether the seal is to be used for a clockwise or counterclockwise rotating shaft, and upon whether the double spiral groove pattern is formed on the primary ring or on the mating ring.

In the embodiments illustrated in FIGS. 1-7, the double spiral groove pattern is formed on the radial face 61, of the primary ring 27. In these embodiments, the shaft 25 and mating ring 51 are adapted to rotate in a clockwise direction (when viewed from end 100, as indicated in FIG. 3). For use with a counterclockwise rotating shaft (viewed in the direction of the arrow 100), the inclination of the double spiral groove pattern on the primary ring 27 would be reversed. Of course, it is also understood that the groove patterns could be formed on the mating ring 51. The direction and inclination of the grooves would be reversed as compared to the direction described above.

In the embodiment illustrated in FIG. 1, the downstream pumping spiral grooves comprise a plurality of spiral grooves 71 formed in the radial face 61 of the primary ring 27. The grooves 71 are relatively shallow, being formed, for example, by etching, and are uniformly disposed around the surface 61 of ring 27. The grooves 71 are open at the outer periphery or circumferential edge of ring 27 to the chamber 65 and are thus exposed to the fluid under pressure. The grooves are inclined in a direction so that when the shaft 25 and the mating ring 51 rotate in a clockwise direction, fluid available in chamber 65 is pumped by the grooves 71 toward the inner circumferential edge 28 of rings 27,51. Stated another way, the grooves 71 pump fluid downstream from the high pressure at 65 toward the low pressure existing at passageway 67, as indicated by arrows 102 in FIG. 1.

As embodied herein, a plurality of upstream pumping spiral grooves 73 are also formed in the radial face 61 of primary ring 27. The grooves 73 are uniformly disposed and the grooves 71,73 are sized, shaped and arranged on the ring face 61 so that each groove 73 intersects only one of the downstream pumping spiral grooves 71. Grooves 73 are inclined in an opposite direction to the grooves 71, as shown in FIG. 1, so that upon clockwise rotation of the shaft 25 and the mating ring 51, the grooves 73 pump fluid in the opposite direction to grooves 71, or back toward the higher fluid pressure at chamber 65, as indicated by arrows 104 in FIG. 1. Downstream pumping grooves 71 terminate at the intersection with an upstream pumping groove 73. Each upstream pumping groove preferably intersects only one downstream pumping groove.

It has been found that by arranging the grooves 71,73 so that each groove 71 intersects only one groove 73, and so that the downstream pumping grooves 71 terminate at the point of intersection 75 with the upstream pumping grooves 73, fluid from the reservoir 65 is effectively used to lubricate the ring faces 61,63 and to provide the desired gap therebetween (for zero contact), and yet eliminate or at least minimize loss of fluid from the reservoir 65. Thus, the fluid pumped by the grooves 71,73 reaches a steady-state condition of travel from the chamber 65, downstream through grooves 71, then back upstream through grooves 73 toward the chamber 65.

The downstream pumping grooves 71 are open to the fluid under pressure at chamber 65 to permit easy access of fluid to the grooves 71, so that pumping commences almost immediately upon start-up. The upstream pumping grooves 73 may also be open to the chamber 65, although this is not necessary, as will be described in more detail below.

The radial projection, as defined above, of the downstream pumping grooves 71 relative to the upstream pumping grooves is selected based upon the desired performance of the seal. The main factors considered are seal life versus liquid leakage. A longer radial projection of the downstream pumping groove 71 increases the fluid pressure between faces 61,63 and increases the gap therebetween and consequently reduces wear of these faces. This feature provides for longer seal life. Note too that the downstream pumping grooves 71 terminate at the intersection with the upstream pumping grooves 73. This point is illustrated in FIG. 1 at 75.

At the same time, increased fluid pressure between the seal faces 61,63 results in higher leakage. If minimum leakage is preferred, the radial projection of the upstream pumping grooves 73 is lengthened and/or the radial projection of the downstream pumping grooves 71 is shortened. This reduces the fluid pressure between the seal faces 61,63 and minimizes leakage, but at the same time may increase seal ring wear.

In addition, such factors as the viscosity and pressure of the fluid being pumped the rotational speed of the shaft 25, and the particular characteristics of the fluid, must be considered when selecting the relative dimensions of the radial projections of the grooves 71,73. The invention, however, is considered applicable to both liquid and gas seals.

Figure 5:
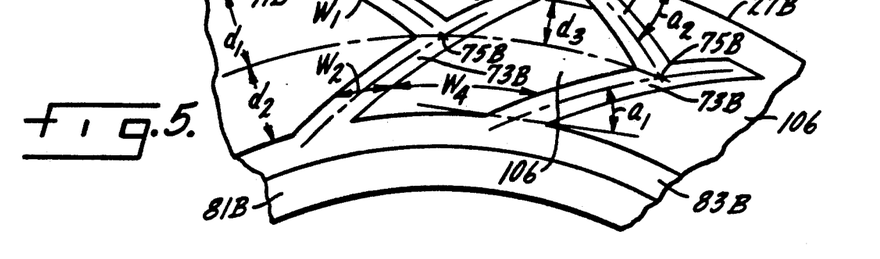
FIG. 5 is a partial view of a seal face with a modified form of spiral pumping grooves.

In accordance with the invention, the relative lengths of the radial projection of the spiral grooves 71,73 are succinctly expressed by the ratios:

$$3 \geq d_2/d_1 \geq \tfrac{1}{3} \text{ and}$$

$$1 \geq d_3/d_1 \geq 0$$

where, as shown in FIG. 5, $d_1$ is the radial projection along a radial line of each downstream pumping groove 71 as taken along its centerline, from its inception commencing at the circumferential edge 28 of ring 27, exposed to high pressure, to its point of termination at the intersection with its associated upstream pumping groove along the respective centerlines;

$d_2$ is the radial projection along a radial line of each upstream pumping groove 73 from its inception near the circumferential edge 30 of ring 27, exposed to low pressure, to its intersection with its associated downstream pumping spiral groove 71; and $d_3$ is the radial projection along a radial line of each of the upstream pumping grooves 73 along its centerline from its intersection with the centerline of its associated downstream pumping groove 71 to its point of termination nearest the circumferential edge 28 of the ring 61 exposed to high pressure.

Based on the foregoing relationships, the radial projection measurement $d_2$ can be no greater than three times the radial projection measurement $d_1$. The radial projection measurement $d_3$ of the portion of the upstream pumping groove that extends beyond the point of intersection with the downstream pumping groove toward the edge of the ring exposed to high pressure may vary from zero to a length equal to the radial projection measurement $d_1$ of the downstream pumping groove. In this latter instance, the upstream pumping groove would extend to the circumferential edge exposed to high pressure, and the upstream intersecting downstream grooves form the shape of a Y.

In the embodiment of FIGS. 1, 3 and 4, the downstream pumping grooves 71 originate at the outer periphery of the radial face 61 and terminate at the intersection with the upstream pumping grooves 73 at point 75. The radial projection measurement ($d_2$) of the upstream pumping groove is the projection along a radial line from its inception near the edge of the ring exposed to low pressure to the intersection point 75. In this embodiment, $d_1$ and $d_3$ are equal.

As further embodied in FIG. 1, the radial projection of the upstream pumping grooves 73 extends beyond the intersection point 75 with downstream grooves 71 to the periphery of face 61, renders the radial dimensions $d_3$ and $d_1$ equal and the ratio $d_3/d_1=1$.

Where the upstream grooves terminate at the intersection point 75A with the downstream grooves, such as is the case for upstream and downstream grooves 73A and 71A, respectively, in the ring 27A of the embodiment of FIG. 2, dimension $d_3$ is zero and ratio $d_3/d_1=0$.

Where the upstream grooves 73B terminate somewhere between the periphery of face 61 and the intersection point 75B with the downstream grooves 73B, as shown in FIG. 5, the ratio $d_3/d_1$ is between 0 and 1. Thus, the relative radial projections $d_1$ and $d_2$, and $d_1$ and $d_3$ of the grooves selectively determine characteristics of the wear versus leakage performance of the seal.

The included angles $a_1, a_2$ of the spiral of the downstream and upstream pumping grooves depend on the size of the seal and face width available. Typically an inclined angle of from about 5° to about 20° from the tangent line is utilized. This relationship is illustrated in FIG. 5. The included angle of the downstream pumping groove is $a_1$ and the included angle of the upstream pumping groove is $a_2$. In the illustrated embodiment the angle in each case is about 20°. Thus $a_1=a_2$.

Further, the included angles need not be equal. The selection of angles could depend upon the application, the fluid being sealed, the pressure to be sealed, the rotational speed and the seal face geometry. The pressure of the fluid, the shaft rotational speed, and such characteristics as the viscosity of the liquid are factors which must be considered in determining the groove width, depth, spacing dimensions and magnitude of the included angle.

In accordance with the invention, the circumferential widths of the grooves 71,73 and the spacing between adjacent grooves are expressed by the ratios:

$3 \geq w_1/w_3 \geq 1/6$ and $3 \geq w_2/w_4 \geq 1/6$ where, as shown by ring 27B in FIG. 5, $w_1$ is the circumferential width of the downstream pumping grooves 71B, and $w_3$ is the circumferential width between the grooves when measured at the same radius upon which $w_1$ is measured; $w_2$ is the circumferential width of the upstream pumping grooves 73B, and $w_4$ is the circumferential width of the lands 106, measured between adjacent grooves 71B and 73B along the same radius as $w_2$ is measured.

As embodied herein, the dimensions $w_1$ is the circumferential measurement of the width of the downstream pumping spiral groove 71. The dimension $w_2$ likewise is the circumferential dimension of the width of the upstream pumping spiral groove 73. The dimension $w_3$ is the circumferential width between adjacent pumping grooves 71, when measured at the same radius that $w_1$ is measured, and $w_4$ is the circumferential width of the lands between upstream pumping grooves 73, when measured at the same radius that $w_2$ is measured. In the different embodiments shown in FIGS. 1, 2 and 5, the circumferential width of grooves 71 (71A,71B) and 73 (73A,73B) are shown approximately equal, although it will be understood that these widths are generally larger at outer radius. In other words, both the circumferential widths of the grooves 71,73 and of the lands 106 between the grooves 71,73 become greater at larger radii, but the ratios $w_1/w_3$ and $w_2/w_4$ remain approximately the same at any specific radius.

In accordance with the invention and as embodied herein, the depth of the grooves 71 and 73 may vary from about 100 microinches to about 5000 microinches, and preferably from about 200 to about 300 microinches. Seals having groove depths from 100 to 500 microinches have been successfully tested, and it is expected that groove depths up to 5000 microinches may be successfully used. The grooves 73,83 of FIG. 4 are shown disproportionally larger for purposes of illustration, and the elevations of the lands 106 between the grooves are shown to be all substantially the same. The depth of grooves 71 may be the same depth as grooves 73 and the grooves 71 or, conversely, 73 may have different depths, if desired. The relative depth dimensions of the grooves and the particular depth dimensions selected will vary again according to fluid pressure, shaft speed, fluid characteristics, etc., and will affect the wear versus leakage characteristics, as described above.

In accordance with the invention, an annular land 81 is disposed on the radial face 61, of the primary ring 27, and defines a static pressure dam. As shown in FIG. 4, the elevation of the annular land 81 relative to the grooves 73,83 is the same as that of the land 106 between the grooves. Further, an annular groove 83 is formed on the face of the primary ring adjacent the annular land 81 and is in fluid communication with the upstream pumping grooves 73.

As embodied herein, and as shown in FIG. 1, the annular land 81 is formed at the inner diameter of the radial face 61 of primary ring 27. Under static conditions, i.e., during periods when the shaft 25 is not rotating, the annular land 81 is held against the confronting face 63 of ring 51 by the force of spring 43 and by the fluid pressure to prevent fluid leakage past the rings 27,51. Annular groove 83 is formed in the face 61 of primary ring 27 outward of the land 81 and, as shown, communicates with each of the upstream pumping grooves 73. The annular groove 83 collects any leakage fluid which may pass toward the inner diameter and beyond the downstream pumping grooves 71 and, during rotation of the shaft 25, this fluid is pumped back toward the fluid under pressure in chamber 65 through the upstream pumping grooves 73. Lands 81 and grooves 83 are also shown in FIGS. 2 and 5.

The above-described double spiral groove pattern is formed in a flat sealing face. The face is etched to form the grooves. The etching may be accomplished by conventional processes.

In operation, fluid being pumped, that is, the fluid under pressure, is available at chamber 65. It enters downstream pumping grooves 71 and is pumped between the confronting faces 61,63 (FIG. 1) of the seal rings 27,51, immediately upon commencement of rotation of the shaft 25. This fluid urges the faces 61,63 apart against the force of springs 43 and against the hydraulic closing pressure of the fluid to provide the desired gap between the faces, which gap provides seal face separation. The fluid pumped through the downstream pumping spiral grooves 71 is then pumped back toward the fluid under pressure at chamber 65 by means of the upstream pumping spiral grooves 73. This controls the "leakage" of fluid. The annular land 81 provides the last barrier to leakage, and the groove 83 serves to collect leakage fluid which is then pumped back toward the fluid pressure reservoir 65 by the upstream pumping grooves 73.

The dimensional ratios and the formation of the grooves 71,73, so that each downstream pumping spiral groove 71 intersects only one upstream pumping groove 73, control the movement of fluid between the confronting faces 61,63. Choice of optimal parameters, as discussed above and as illustrated in the preferred embodiments, provide the desired characteristics of minimal face separation and minimal leakage past the faces. The effective prevention of contact between the faces 61,63 and the elimination of leakage between the faces renders the seal construction of this invention most desirable, since it renders the seal highly durable and low in power consumption.

The illustrated embodiment shows an outside pressurized seal, i.e., the fluid under pressure is at the radial outer circumferential edge 30 of the seal rings 27,51. As previously indicated, the fluid under pressure could be adjacent the inner circumferential edge 28 of these rings; that is, the seal could be inside pressurized, in which case the outer circumferential edge of the rings would be exposed to the low or ambient pressure. In that case, the downstream pumping grooves would extend from the inner circumferential edge 28 or periphery of the seal face 61 (FIG. 4) toward the outer circumferential edge 30 or periphery of the face 61. The upstream pumping grooves would be inclined in the opposite direction and intersect with the downstream pumping spiral grooves. The static sealing dam or land 81 would be at the outer periphery of the ring face 61 and the leakage accumulation groove 83, would be immediately inwardly of the dam-forming land.

FIG. 6 illustrates a primary seal ring 27C operated succesfully in a liquid pump against a mating ring (not shown). FIG. 6 illustrates the case of a groove pattern, referred to above, in which the intersection point 75 of the upstream pumping grooves 73 and the downstream pumping grooves 71 is also the point of termination of the upstream pumping grooves. The pump operating conditions were as follows:

| Speed: | 25,000 rpm |
|---|---|
| Pressure range: | About 0.1 to 30.0 psi. at chamber 65 |
| Fluid: | Light Oil (about SAE 10W) |
| Test Time: | 176 hours |
| Springload: (Springs 43) | 6 lbs. |

The parameters of the groove pattern were as follows:

| Diameter of Ring Outer Periphery Exposed to High Pressure (30) | 2.400 inches |
|---|---|
| Diameter of Inner Periphery of Ring Exposed to Low Pressure (28) | 2.026 inches |
| Groove Depth | 500 microinches |
| Groove Angles | $a_1, a_2 = 10°$ |
| $w_1/w_3 = 1$ | |
| $w_2/w_4 = 1$ | |
| $d_2/d_1 = 1.98$ | |
| $d_3/d_1 = 0.0$ | |

The total measured leakage was 0.02 cubic centimeters of fluid, which in this test was a light oil.

Another embodiment of a primary seal ring 27D, illustrated in FIG. 7, was operated successfully against a mating ring (not shown) in a liquid pump. FIG. 7 illustrates another case which was referred to above, in which the upstream pumping groove 73 extends beyond the intersection point 75 of the grooves and continues to the outer edge of periphery 30 of the ring 27. The operating parameters under which the seal ring 27D was tested are listed below:

| Speed: | 25,000 rpm. |
|---|---|
| Pressure range: | About 0.1 to 30 psi. at chamber 65 |
| Fluid: | Light Oil SAE 10W |
| Test Time: | 2,000 hours |
| Springload: | 6 lbs. |

The groove pattern parameters were as follows:

| Groove Depth: | 500 microinches |
|---|---|
| Groove Angles: | $a_1, a_2 = 10°$ |
| $w_1/w_3 = 1$ | |
| $w_2/w_4 = 1$ | |
| $d_2/d_1 = 1.0$ | |
| $d_3/d_1 = 1.0$ | |

The leakage rate measured was 0.3 cubic centimeters.

The present invention has been described in detail herein as applicable to mechanical seals utilized in liquid handling devices, such as pumps. It is believed that the principles of the invention are applicable also to seals used in gas handling devices, such as compressors, turbines, etc.

By the foregoing, there has been disclosed a mechanical seal construction which satisfies the inventive concepts set forth hereinabove. It will be understood that various additions, substitutions, modifications and omissions may be made to the present invention without departing from the scope or spirit of the invention as encompassed by the appended claims. Therefore, it is understood that the present invention encompasses these additions, substitutions, modifications and omissions provided they come within the scope of the appended claims and their equivalents.

What is claimed is:

1. A mechanical seal construction comprising a stationary housing, a shaft rotatably supported in said housing, a pair of relatively rotatable sealing rings surrounding said shaft, one of said rings being rotatable with said shaft and the other being fixed relative to said housing, said rings having confronting, generally radial faces, means normally biasing one of said rings toward other, said rings having a first set of circumferential edges adapted to be exposed to a fluid under pressure to be sealed in said housing and having other circumferential edges adapted to be exposed to a lower pressure outside of said housing, spiral groove means in the confronting face of one of said rings, said spiral groove means including a plurality of uniformly disposed downstream pumping grooves formed to communicate with the fluid to be sealed at said circumferential edge of said ring adapted to be exposed to the fluid under pressure and extending toward said other circumferential edge of said one ring, the downstream pumping grooves having an included angle at the point of intersection with a tangent of the circumferential edge of said ring which is exposed to the fluid under pressure, said downstream groove included angle being in a range of from 5° to 20°, said downstream pumping grooves being operable during rotation of said shaft to pump fluid from said circumferential edge exposed to the fluid to be sealed toward the other circumferential edge of said ring, said spiral groove means further including a plurality of uniformly disposed upstream pumping grooves intersection only a respective one of said downstream pumping spiral grooves and inclined oppositely thereto, the upstream pumping grooves having an included angle at the point of intersection with the tangent of the circumferential edge of said ring which is exposed to the relatively lower pressure in the environment outside of said housing, said upstream pumping groove included angle being in a range of from about 5° to about 20°, said upstream pumping grooves operable to pump fluid which is between said confronting ring faces back toward said circumferential edge exposed to the fluid to be sealed, said downstream pumping grooves terminating at the intersection thereof with said upstream pumping grooves.

2. The seal as claimed in claim 1, wherein the relation between the radial projection of each said spiral groove taken along a radial line is expressed by the ratios:

$$3 \geq d_2/d_1 \geq \tfrac{1}{3}$$

where $d_1$ is the radial projection of the downstream pumping spiral groove, and $d_2$ is the radial projection of the upstream pumping spiral groove from its inception to the intersection along its centerline with its associated downstream pumping spiral groove along its respective centerline.

3. The seal as claimed in claim 1, wherein the relation between the radial projection of said spiral groove taken along radial line is expressed by the ratios:

$$1 \geq d_3/d_1 \geq 0$$

where $d_1$ is the radial projection of the downstream pumping spiral groove, and $d_3$ is the radial projection of the upstream pumping spiral groove from the intersection along its centerline with the downstream pumping spiral groove along its centerline to its point of termination.

4. The seal as claimed in claim 3, further including an annular land on said ring containing said grooves at the circumferential edge of said ring adapted to be exposed to said low pressure forming a static pressure dam between said rings.

5. The seal claimed in claim 4, further including an annular groove on said ring adjacent said annular land on the side of said land disposed toward said circumferential edge of said ring adapted to be exposed to said fluid under pressure said groove communicating with the upstream spiral grooves, said annular groove having a groove depth which is substantially identical to said spiral groove depth.

6. The seal claimed in claim 1, said grooves having circumferential width dimensions expressed by the following ratios:

$$3 \geq w_1/w_3 \geq 1/6 \text{ and}$$

$$3 \geq w_2/w_3 \geq 1/6$$

where $w_1$ is the groove circumferential width of the downstream pumping spiral grooves, $w_2$ is the groove circumferential width of the upstream pumping spiral grooves, and $w_3$ is the circumferential width between pumping grooves.

7. The seal claimed in claim 1, the depth of said grooves being from about 100 microinches to about 500 microinches.

8. The seal claimed in claim 1, the depth of said grooves being from about 200 microinches to about 400 microinches.

9. The seal claimed in claim 1, the depth of said grooves being from about 200 microinches to about 300 microinches.

10. The seal claimed in claim 3, wherein each said upstream pumping groove terminates at its intersection with one of said downstream pumping grooves.

11. The seal as claimed in claim 3 wherein said upstream pumping grooves extend beyond the intersection with said downstream pumping grooves in a direction toward said circumferential edge of said ring adapted to be exposed to the fluid under pressure.

12. The seal as claimed in claim 11 wherein said upstream pumping grooves terminate at a point intermediate the intersection with said downstream pumping grooves and the circumferential edge of said ring adapted to be exposed to the fluid to be sealed.

13. The seal claimed in claim 4, wherein said upstream pumping grooves terminate at the intersection with said downstream pumping grooves.

14. The seal as claimed in claim 4 wherein said upstream pumping grooves extend beyond the intersection with said downstream pumping grooves in a direction toward said circumferential edge of said ring adapted to be exposed to the fluid under pressure.

15. The seal as claimed in claim 4 wherein said upstream pumping grooves terminate at a point intermediate the intersection with said downstream pumping grooves and the circumferential edge of said ring adapted to be exposed to the fluid to be sealed.

16. The seal claimed in claim 5, wherein said upstream pumping grooves terminate at the intersection with said downstream pumping grooves.

17. The seal as claimed in claim 2 wherein said circumferential edge exposed to the fluid to be sealed is disposed at the outside diameter of said ring.

18. The seal as claimed in claim 2 wherein said circumferential edge disposed to the fluid to be sealed is disposed a the inside diameter of the said ring.

19. The seal as claimed in claim 1 wherein said included angle of both the upstream pumping grooves and the downstream pumping grooves is about 20°.

20. The seal as claimed in claim 1 wherein said including angle of the downstream pumping grooves is about 20°.

* * * * *

UNITED STATES PATENT AND TRADEMARK OFFICE
CERTIFICATE OF CORRECTION

PATENT NO. : 5,201,531
DATED : April 13, 1993
INVENTOR(S) : Wei-Tang Lai

It is certified that error appears in the above-identified patent and that said Letters Patent is hereby corrected as shown below:

Column 13, line 4, delete "intersection" an dsubstitute therefor --intersecting--.

Signed and Sealed this

Seventeenth Day of May, 1994

Attest:

BRUCE LEHMAN

*Attesting Officer*     Commissioner of Patents and Trademarks